June 2, 1925.

R. B. RESPESS

FLEXIBLE TRUSS

Filed Oct. 26, 1920

Inventor
Roland B. Respess
By his Attorney
N. Ade Romeville

Patented June 2, 1925.

1,539,954

UNITED STATES PATENT OFFICE.

ROLAND B. RESPESS, OF NEW YORK, N. Y.

FLEXIBLE TRUSS.

Application filed October 26, 1920. Serial No. 419,576.

*To all whom it may concern:*

Be it known that I, ROLAND B. RESPESS, citizen of the United States, and resident of the borough of Manhattan, city of New York, in the county of New York and State of New York, have invented certain new and useful Improvements in a Flexible Truss, of which the following is a specification.

Figure 1:
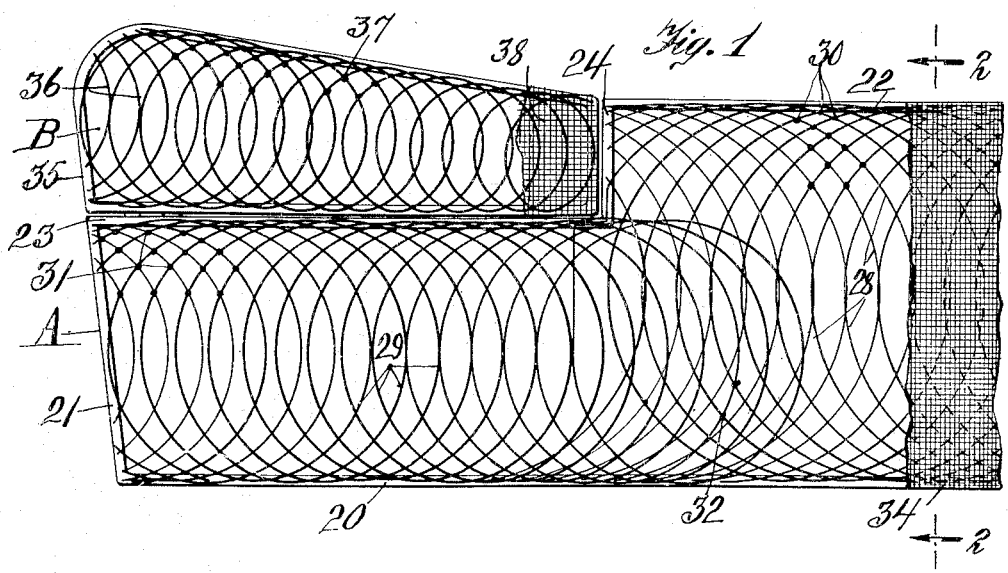
Figure 2:
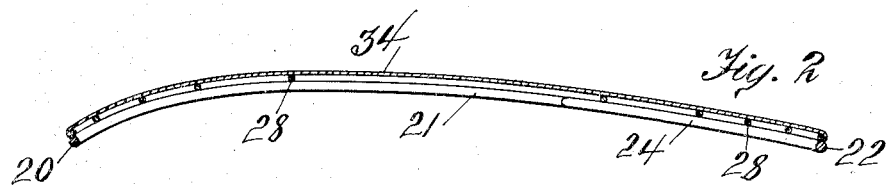
Figure 3:
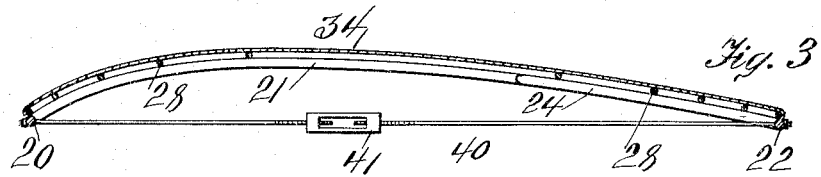
Figure 4:
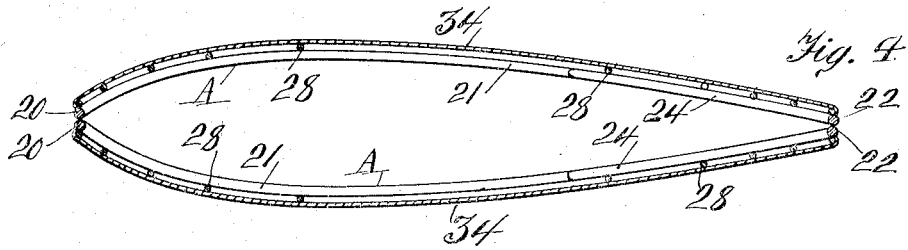

This invention relates to a flexible truss. Its object is the production of a truss consisting of windings of wire or other material which overlap each other. The windings are in the form of a flattened helix, constituting what I term in this specification a netting. This sheet may be connected to a frame and may be concaved or convexed, in which latter forms it is useful for aeroplane wings, although it may be used for many other purposes. In this exemplification of the invention, Fig. 1 represents a fragmentary plan view of an aeroplane wing with the flexible truss incorporated therewith; Fig. 2 shows an enlarged section of Fig. 1 on the line 2, 2; Fig. 3 is a section similar to Fig. 2 with a modification and Fig. 4 represents a cross section of an aeroplane wing with another modification of the invention.

Referring to Figs. 1 and 2 a frame A of an aeroplane wing is indicated with the front rail member 20, end rail member 21 and the rear rail member 22 having the stepped portion 23 and the connecting portion 24.

Overlapping circular windings 28 of wire connect the members 20 and 22 and overlapping circular windings 29 of wire, in this instance smaller in diameter than the windings 28, connect the member 20 and the stepped portion 23 of the frame. The windings 28 may be connected together at their intersections by solder, short wires or other fastening devices indicated at 30. The windings 29 may be connected by similar means indicated at 31 and the windings 28 and 29 may also be similarly connected as indicated at 32.

A cover 34 is provided for the windings 28 and 29. An aileron B is hinged to frame A and comprises the second frame 35 to which are secured the overlapping circular wire windings 36, which in this instance decrease in diameter from one end of the frame 35 to the other. The windings 36 may also be connected at their intersections by solder or other fastening means indicated at 37. A cover 38 similar to 34 is provided for the frame 35.

In Fig. 3 the same elements are indicated as shown in Fig. 2 with a tie rod 40 having the turnbuckle 41 connecting the members 20 and 22. The said members 20 and 22 may be connected by a number of tie rods 40.

In Fig. 4 two of the frames A, shown in Fig. 1, are superimposed over each other and connected to each other by solder or other fastening means.

In these exemplifications of the invention, the windings 28, 29 and 36 are shown of wire in circular form, and it is to be understood that they may be oval or of various shapes and materials. The windings are first prepared in the form of a helix and then flattened out to form a netting, which latter may be flat or curved, and on account of its flexibility may be curved to various forms.

Having described my invention what I desire to secure by Letters Patent and claim is:—

1. A trussed aeroplane wing comprising a frame having spaced rail members, a flattened helix comprising a series of consecutive turns disposed substantially in the plane defined by said rails, each turn of the helix being connected to each of the rails, and a cover for the frame extending over all of the turns of the helix.

2. In a truss the combination of a frame, overlapping circular windings of consecutive increasing diameter extending from one end of the frame to the other and fastened thereto.

3. In a truss the combination of a frame, overlapping windings of consecutive increasing diameter extending from one end of the frame to the other and fastened thereto and a cover for the windings.

4. In a truss the combination of a frame, overlapping windings connected to the frame and to each other at their intersections.

5. In a truss the combination of a frame, overlapping windings connected to the frame and to each other at their intersections and a cover for the windings.

6. In a truss the combination of a frame, overlapping windings connected to the frame and to each other at their intersections, overlapping windings smaller in diameter at one end of the frame and connected thereto and to each other and a cover for all the windings.

7. In a wing for an aeroplane the combination of a frame, overlapping wire windings supported on the frame constituting a netting, a cover-over for the windings of the frame, an aileron hinged to said frame comprising a second frame, overlapping windings supported on the second frame and a cover for the windings of the second frame.

Signed at the borough of Manhattan, city of New York in the county of New York and State of New York this 19th day of October A. D. 1920.

ROLAND B. RESPESS.